(12) United States Patent
Frühauf et al.

(10) Patent No.: US 12,493,088 B2
(45) Date of Patent: Dec. 9, 2025

(54) DETECTION UNIT FOR MAGNETIC SENSOR

(71) Applicant: Endress+Hauser SE+Co. KG, Maulburg (DE)

(72) Inventors: Dietmar Frühauf, Lörrach (DE); Raphael Kuhnen, Schliengen (DE)

(73) Assignee: Endress+Hasuer SE+Co. KG, Maulburg (DE)

( * ) Notice: Subject to any disclaimer, the term of this patent is extended or adjusted under 35 U.S.C. 154(b) by 143 days.

(21) Appl. No.: 18/561,558

(22) PCT Filed: Apr. 20, 2022

(86) PCT No.: PCT/EP2022/060381
§ 371 (c)(1),
(2) Date: Nov. 16, 2023

(87) PCT Pub. No.: WO2022/242971
PCT Pub. Date: Nov. 24, 2022

(65) Prior Publication Data
US 2024/0248153 A1 Jul. 25, 2024

(30) Foreign Application Priority Data
May 20, 2021 (DE) ...................... 10 2021 113 195.2

(51) Int. Cl.
*G01R 33/032* (2006.01)
(52) U.S. Cl.
CPC .................. *G01R 33/032* (2013.01)
(58) Field of Classification Search
CPC ...... G01R 33/032; G01R 33/12; G01R 33/60; G01R 33/26; G01N 24/10
(Continued)

(56) References Cited

U.S. PATENT DOCUMENTS

2018/0136291 A1* 5/2018 Pham ...................... G01R 33/24
2019/0154766 A1* 5/2019 Lutz ...................... G01R 15/245
(Continued)

FOREIGN PATENT DOCUMENTS

DE         3742878 A1    7/1989
DE    102014219550 A1    3/2016
(Continued)

OTHER PUBLICATIONS

Schloss, Jennifer M., et al., Simultaneous Broadband Vector Magnetometry Using Solid-State Spins, Physical Review Applied 10, 3 (Sep. 2018): 034044, 2018 American Physical Society, http://dx.doi.org/10.1103/ PhysRevApplied.10.034044, 17 pp.
(Continued)

*Primary Examiner* — Judy Nguyen
*Assistant Examiner* — Robert P Alejnikov
(74) *Attorney, Agent, or Firm* — Mark A. Logan; Endress+Hauser (USA) Holding, Inc.

(57) ABSTRACT

A detection device for a magnetic sensor for detecting a magnetic field by means of a crystal body having at least one defect comprises a light source for exciting the defect; an excitation unit for producing a first excitation signal having a first specifiable frequency and a second excitation signal having a second specifiable frequency; a detector of a magnetic-field-dependent fluorescence signal of the crystal body; and an evaluation unit designed to determine the first excitation frequency and the second excitation frequency of the first and second excitation signals on the basis of the fluorescence signal such that the fluorescence signal as a function of the frequency has a minimum at the first excitation frequency and/or at the second excitation frequency Also disclosed is a magnetic sensor, a sensor device, and a method for detecting a magnetic field.

5 Claims, 4 Drawing Sheets

(58) Field of Classification Search
USPC ....................................................... 324/244.1
See application file for complete search history.

(56) References Cited

U.S. PATENT DOCUMENTS

| | | | |
|---|---|---|---|
| 2019/0178959 A1 | 6/2019 | Barry et al. | |
| 2020/0057117 A1* | 2/2020 | Nishibayashi | G01R 33/0017 |
| 2022/0397429 A1* | 12/2022 | Burchard | G01D 5/26 |

FOREIGN PATENT DOCUMENTS

| | | |
|---|---|---|
| DE | 102016210259 A1 | 12/2017 |
| DE | 102017205099 A1 | 9/2018 |
| DE | 102017205265 A1 | 10/2018 |
| DE | 102018214617 A1 | 3/2020 |
| DE | 102020206218 A1 | 11/2021 |
| DE | 102020123993 A1 | 3/2022 |
| DE | 102021100223 A1 | 7/2022 |

OTHER PUBLICATIONS

Fescenko, Ilja, et al., Diamond magnetometer enhanced by ferrite flux concentrators, arXiv:1911.05070v1 [physics.ins-det] Nov. 12, 2019, Nov. 13, 2019, 18 pp.

Schloss, Jennifer M., et al., Simultaneous Broadband Vector Magnetometry Using Solid-State Spins, arXiv:1803.03718v2 [quant-ph] Mar. 26, 2018, Mar. 28, 2018, 13 pp.

* cited by examiner

DETECTION UNIT FOR MAGNETIC SENSOR

CROSS-REFERENCE TO RELATED APPLICATIONS

The present application is related to and claims the priority benefit of DPMA Patent Application No. 10 2021 113 195.2, filed on May 20, 2021, and International Patent Application No. PCT/EP2022/060381, filed Apr. 20, 2022, the entire contents of which are incorporated herein by reference.

TECHNICAL FIELD

In industrial process automation, a wide variety of field devices are used for monitoring and/or determining at least one—for example, chemical or physical-process variable of a medium in a wide variety of embodiments. Therefore, within the framework of the present application, all measuring devices that are used in proximity to the process and that supply or process the process-relevant information are in principle termed field devices, therefore including also remote I/O's, wireless adapters, and general electronic components which are arranged at the field level. The companies of the Endress+Hauser Group produce and distribute a large variety of such field devices.

BACKGROUND

Many field devices are based upon the measurement of magnetic fields and the identification and/or ascertainment of the respective process variable and/or characteristic variable on the basis of a variable related to the respective magnetic field. Different types of magnetic field sensors are generally used to detect the magnetic field. The accuracy of such field devices is largely dependent upon the measurement accuracy of the magnetic field sensors. It would thus be desirable to be able to detect a magnetic field as precisely as possible in the simplest possible manner.

A newer development in the field of sensor technology is represented by so-called quantum sensors, in which a wide variety of quantum effects are utilized for determining various physical and/or chemical measured variables. In the field of industrial process automation, such approaches are of interest in particular with regard to increasing efforts towards miniaturization, while at the same time increasing the performance of the respective sensors.

Quantum sensors are based upon the fact that certain quantum states of individual atoms can be controlled and read very precisely. In this way, for example, precise and low-interference measurements of electrical and/or magnetic fields as well as gravitational fields with resolutions in the nanometer range are possible. For example, various spin-based sensor arrangements and systems based upon quantum-optical effects, such as quantum gravimeters, NMR gyroscopes, or optically-pumped magnetometers, are known, wherein the latter are based in particular upon gas cells.

In the case of spin-based quantum sensors, atomic transitions, e.g., in different crystal bodies, are utilized in order to detect even minor changes of movements, electrical and/or magnetic fields, or else gravitational fields. Typically, diamond with at least one silicon or nitrogen defect center, silicon carbide with at least one silicon defect, or hexagonal boron nitride with at least one defect color center is used as crystal body. The crystal bodies can in principle have one or more vacancies. Spin-based quantum sensors allow, for example, highly precise determination of magnetic fields.

For example, DE 3742878 A1 describes an optical magnetic sensor in which a crystal is used as a magnet-sensitive optical component.

Various further spin-based sensors have become known, for example, from the documents DE 10 2017 205 099 A1, DE 10 2017 205 265 A1, DE 10 2014 219 550 A1, DE 10 2018 214 617 A1, DE 10 2016 210 259 A1, and from the heretofore unpublished German patent applications with the file numbers 10 2020 123 993.9 and 10 2021 100223.0.

A spin-based sensor arrangement having a crystal body having at least one defect typically comprises an excitation unit for optical excitation of the defect, a detector for detecting a magnetic-field-dependent fluorescence signal from the crystal body, and, where applicable, a unit for producing high-frequency radiation or microwave radiation in the region of the crystal body. The magnetic field can then be optically detected on the basis of the magnetic electron spin resonances of the spin triplet of the ground state of the defect in the crystal body (ODMR, optically-detected magnetic resonance). The fluorescence signal has two characteristic minima corresponding to a frequency of the high-frequency radiation or microwave radiation, and thus the energetic position of the electron spin resonances. In order to be able to detect the magnetic field precisely, a detection of the minima in the fluorescence signal is, correspondingly, necessary. This is typically achieved by successively running through different frequencies and recording the fluorescence signal as a function of the frequency. However, this is a comparatively complex detection method. Frequency modulation of the high-frequency or microwave radiation together with a lock-in is also known. For example, the frequency is ascertained which brings about the greatest steepness of an edge of the amplitude of the fluorescence signal.

SUMMARY

Proceeding from this, the object of the present invention is to provide a possibility for simplified and improved detection of the fluorescence signal for spin-based quantum sensors.

This object is achieved by the detection device, by the magnetic sensor, by the sensor device, and by the method according to the present disclosure.

With regard to the detection device, the object of the invention is achieved by a detection device for a magnetic sensor for detecting a magnetic field by means of a crystal body having at least one defect, comprising:
  a light source for optical excitation of the defect in the crystal body by means of an excitation light,
  an excitation unit for producing high-frequency radiation or microwave radiation in the region of the crystal body, which excitation unit is designed to produce a first excitation signal having at least one first specifiable excitation frequency and a second excitation signal having a second specifiable excitation frequency,
  a detector for detecting a magnetic-field-dependent fluorescence signal from the crystal body, and
  an evaluation unit which is designed for
    determining the first excitation frequency and/or the second excitation frequency of the first excitation signal and/or the second excitation signal on the basis of the fluorescence signal such that the fluorescence signal as a function of the frequency has a minimum at the first excitation frequency and/or at the second excitation frequency, and ascertaining a value representative of the magnetic field on the basis of the first excitation frequency and/or the second excitation frequency.

According to the invention, the first excitation frequency and/or the second excitation frequency of the first excitation signal and/or the second excitation signal is thus determined in parallel, and in particular simultaneously, on the basis of the fluorescence signal. The two characteristic frequencies form independently of one another and can, advantageously, be ascertained simultaneously.

In contrast to the prior art, in which a cyclic detection of the entire ODMR spectrum is carried out with only one measurement channel, a multi-channel measurement operation is provided in the case of the present invention. While, in single-channel measurement operation, information about the magnetic flux density can be provided only discontinuously, the present invention allows the simultaneous and continuous detection of relevant information from the ODMR spectrum, in particular the detection of the two minima in the fluorescence signal. In this way, the effort with regard to the detection of the fluorescence minima can be reduced considerably.

The excitation unit for optical excitation of the defect can, for example, be a laser or a light-emitting diode (LED). The detector may in turn be, for example, a photodetector or a CMOS sensor. In addition, the detection unit can have further optical elements—for example, different filters, lenses, or mirrors. The excitation unit and the detector can be arranged, on the one hand, in the region of the crystal body, or can be spatially separated from the crystal body. In addition, an optical fiber arrangement with at least one optical fiber can be present, which optical fiber arrangement can be arranged and/or configured in such a way that the excitation light is guided from the excitation unit to the crystal body and/or the fluorescence signal from the crystal body to the detector.

In one embodiment, the value representative of the magnetic field concerns the magnetic permeability, the magnetic susceptibility, or the magnetic flux density.

In a further embodiment, the excitation unit comprises a device, in particular a voltage-controlled oscillator, for producing at least one excitation signal. In addition, the excitation unit can have a control unit for regulating at least the first excitation frequency.

A further embodiment of the detection unit includes that the evaluation unit comprise a computing unit in which at least one, in particular, multi-variable, algorithm, and, in particular, a variation algorithm, a regression algorithm, or an, in particular, adaptive, multi-parameter-fit algorithm, is stored for determining the first excitation frequency and/or the second excitation frequency on the basis of the fluorescence signal.

In particular, the algorithm can also be a self-teaching algorithm. The algorithm is preferably designed to ascertain the first excitation frequency and/or the second excitation frequency on the basis of a correlated variation. In this case, the first excitation frequency and/or the second excitation frequency are determined such that the first local minimum and/or the second local minimum occur in the fluorescence signal at the first excitation frequency and/or at the second excitation frequency.

In this regard, it is advantageous if the excitation unit comprises a first device for producing the first excitation signal and a second excitation unit comprises a device for producing the second excitation signal, which devices are controlled by means of a correlated variation of at least one parameter of the devices and an adaptive, multi-parameter fitting method such that the fluorescence signal has a minimum.

One embodiment of the detection unit includes that the evaluation unit, in particular the computing unit, be configured to determine a local or global extreme value, in particular a minimum of an integral intensity of the fluorescence signal, and to ascertain the first excitation frequency and/or the second excitation frequency on the basis of the extreme value.

In a further embodiment, the evaluation unit is configured to produce at least one modulation excitation signal having a specifiable modulation excitation frequency, which is superimposed on the first excitation signal and/or the second excitation signal. On the basis of the modulation signal, the first excitation signal and the second excitation signal can be distinguished from one another, for example. Advantageously, the frequency of the modulation excitation signal is low compared to the frequency of the respective excitation signal.

It is advantageous if the evaluation unit, in particular a computing unit, is configured to determine the modulation excitation frequency in such a way that it is proportional to the difference between the first excitation frequency and the second excitation frequency. In this case, a suitable algorithm is stored in the computing unit. In particular, the modulation frequency is varied such that the fluorescence signal has an extreme value, and in particular a minimum.

In this context, it is also advantageous if the excitation unit comprises a mixing unit, in particular a multiplier, wherein the excitation unit is configured to produce a base excitation signal having a base excitation frequency and a modulation excitation signal having a modulation excitation frequency, and to produce the first excitation signal and the second excitation signal in such a way that the first excitation frequency is formed from a sum of the base excitation frequency and the modulation frequency, and the second excitation frequency is formed from a difference between the base excitation frequency and the modulation frequency. The base excitation frequency is accordingly a center frequency, which is arranged centrally between the first excitation frequency and the second excitation frequency. Preferably, the base excitation signal and the modulation frequency are varied such that the fluorescence signal has an extreme value, and in particular a minimum.

A further embodiment of the detection unit includes that the excitation unit have a first device for producing the first excitation signal having the first specifiable excitation frequency and a second device for producing the second excitation signal having the second specifiable excitation frequency. In this context, two control units can also be present for setting the first excitation frequency and the second excitation frequency.

It is advantageous if the evaluation unit is configured to produce a first modulation excitation signal having a first specifiable modulation excitation frequency for modulating the first excitation signal and a second modulation excitation signal having a second specifiable modulation excitation frequency for modulating the second excitation signal.

It is also advantageous if the evaluation unit is configured to detect the first excitation frequency and the second excitation frequency on the basis of the first modulation excitation frequency and the second modulation excitation frequency.

It is also possible to carry out an, in particular, low-frequency modulation of the first excitation signal and/or of the second excitation signal or of the base excitation signal to avoid interference effects.

The object of the invention is further achieved by a magnetic sensor for detecting a magnetic field, comprising a detection unit in accordance with the invention according to at least one of the described embodiments.

The object of the invention is also achieved by a sensor device for determining and/or monitoring a process variable and/or characteristic variable of a medium in a container, comprising
- a crystal body with at least one defect,
- a magnetic field device for producing a magnetic field, wherein the magnetic field device is arranged such that a magnetic field in the region of the crystal body and in the region of the medium located inside the container can be produced by means of the magnetic field device, and
- a detection unit in accordance with the invention according to at least one of the described embodiments, wherein the sensor device is configured to ascertain at least one value of the process variable on the basis of the value representative of the magnetic field.

With regard to the sensor device, it is advantageous if the crystal body is a diamond having at least one silicon or nitrogen defect, is silicon carbide having at least one silicon defect, or is hexagonal boron nitride having at least one defect color center.

Finally, the object of the invention is achieved by a method for detecting a magnetic field by means of a magnetic sensor using a crystal body having at least one defect, comprising the following method steps:
- optically exciting the defect of the crystal body by means of an excitation light,
- producing high-frequency radiation or microwave radiation in the region of the crystal body by means of a first excitation signal having at least a first specifiable excitation frequency and a second excitation signal having a second specifiable excitation frequency,
- detecting a magnetic-field-dependent fluorescence signal from the crystal body,
- determining the first excitation frequency and/or the second excitation frequency of the first excitation signal and/or the second excitation signal on the basis of the fluorescence signal such that the fluorescence signal as a function of the frequency has a minimum at the first excitation frequency and/or at the second excitation frequency, and
- ascertaining a value representative of the magnetic field on the basis of the first excitation frequency and/or the second excitation frequency.

The embodiments described in connection with the detection unit according to the invention are applicable mutatis mutandis for the magnetic sensor according to the invention, the sensor arrangement according to the invention, and the method according to the invention, and vice versa.

BRIEF DESCRIPTION OF THE DRAWINGS

The present disclosure and its advantageous embodiments are explained in more detail with reference to the following figures. In the figures.

In the figures, identical elements are provided with the same reference signs.

DETAILED DESCRIPTION

Figure 1A:
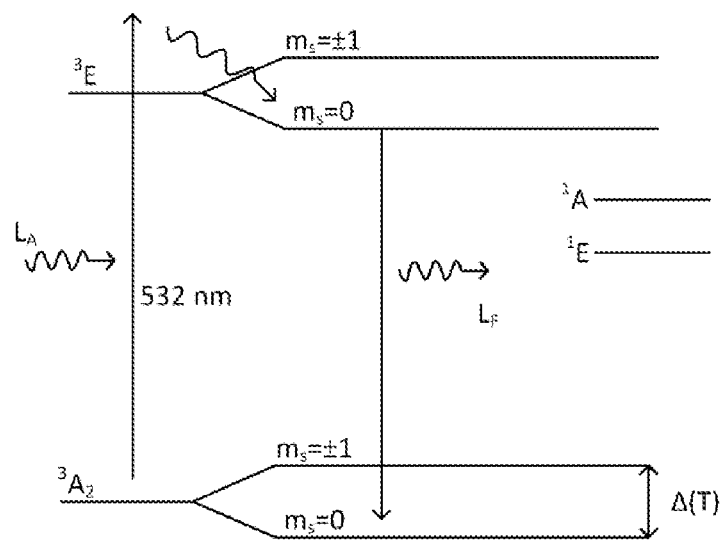
FIG. 1 shows (a) a simplified energy scheme for a negatively-charged NV center in diamond and (b) the fluorescence signal as a function of the frequency.

In FIG. 1a, a simplified energy diagram for a negatively-charged NV center in diamond is shown. In this way, the excitation of the defect and the detection of fluorescence can be explained by way of example. The following considerations apply equally to other crystal bodies having corresponding defects.

In diamond, each carbon atom is typically covalently bonded to four further carbon atoms. A nitrogen vacancy center (NV center) consists of a vacancy in the diamond lattice, i.e. an unoccupied lattice site, and a nitrogen atom as one of the four neighboring atoms. In particular, the negatively-charged NV$^-$ centers are important for the excitation and evaluation of fluorescence signals. In the energy diagram of a negatively-charged NV center, there is a triplet ground state $^3$A and an excited triplet state $^3$E, each of which has three magnetic substates $m_s=+/-1$. Furthermore, there are two metastable singlet states $^1$A and $^1$E between the ground state $^3$A and the excited state $^3$E. In the absence of an external magnetic field, a splitting of the two states $m_s=+/-1$ from the ground state $m_s=0$ occurs, which is referred to as zero field splitting A and which is dependent upon the temperature T.

Excitation light $L_A$ from the green range of the visible spectrum, e.g., an excitation light $L_A$ having a wavelength of 532 nm, excites an electron from the ground state $^3$A into a vibrational state of the excited state $^3$E, which returns to the ground state $^3$A by emitting a fluorescence photon $L_F$ having a wavelength of 630 nm.

An additional applied magnetic field with a magnetic field strength B leads to a splitting (Zeeman splitting) of the magnetic sub-states, so that the ground state consists of three, energetically-separated sub-states, each of which can be excited. The intensity of the fluorescence signal $L_F$ is dependent upon the respective magnetic sub-state from which it was excited, so that the magnetic flux density B can be determined on the basis of, for example, the distance between the fluorescence minima. The equation $\Delta f = f_2 - f_1 \sim \gamma B$ applies, where $\gamma$ is the gyromagnetic ratio, and B is the magnetic flux density.

Figure 1B:
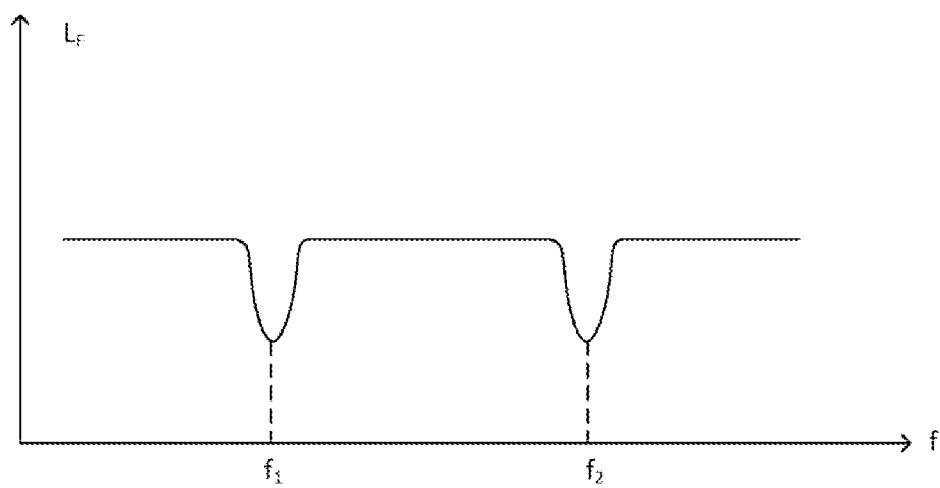

In FIG. 1b, the fluorescence signal $L_F$ is illustrated as a function of the frequency f. The fluorescence signal $L_F$ has a minimum at the two characteristic frequencies $f_1$ and $f_2$. These two frequencies $f_1$ and $f_2$ correspond to the energetic position of electron spin resonances. Accordingly, from the two frequencies $f_1$ and $f_2$, a value representative of the magnetic field can be obtained, e.g., the magnetic flux density, the magnetic permeability, or the magnetic susceptibility.

The present invention provides a multi-channel, simultaneous determination of the first frequency $f_1$ and the second frequency $f_2$, wherein the frequencies can be detected continuously. In this connection, various embodiments for a detection unit according to the invention are possible, of which three preferred variants are explained in more detail below.

Figure 2:
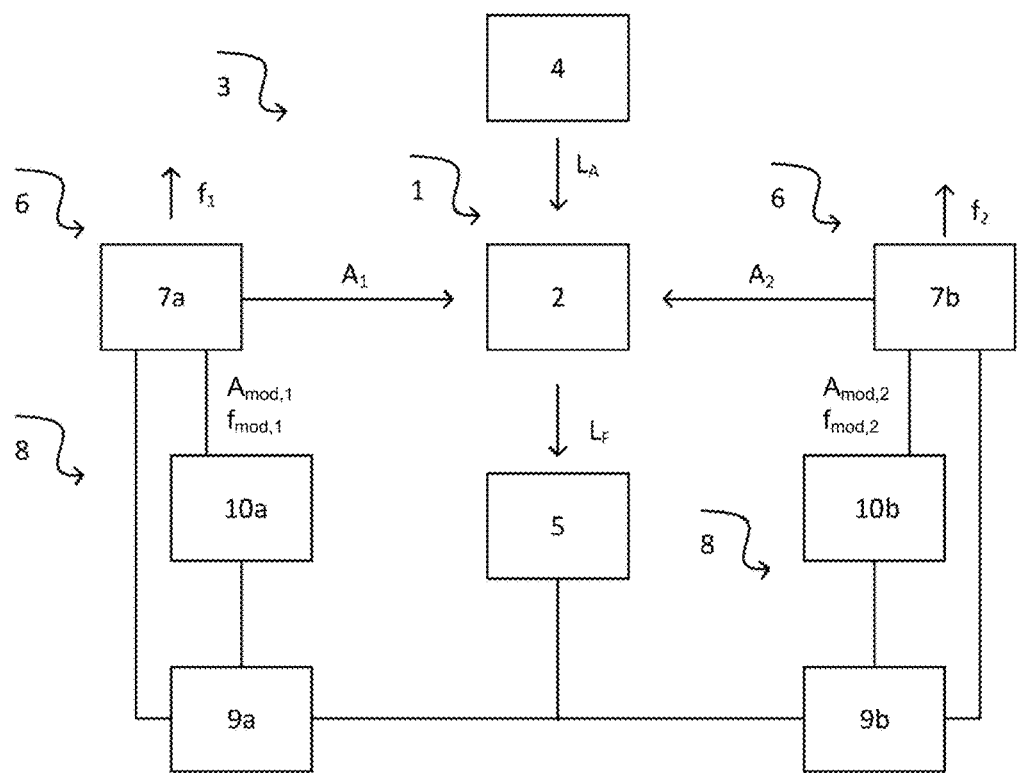
FIG. 2 shows a first embodiment of a detection unit according to the present disclosure.

FIG. 2 shows a first possible embodiment of a detection unit 3 according to the invention for a magnetic sensor 1 with a crystal body 2 having at least one defect. The crystal body 2 is irradiated by means of the light source 4 with an excitation light $L_A$, and a fluorescence signal $L_F$ of the crystal body 2 is detected by means of the detector 5.

In addition, the detection unit 3 comprises an excitation unit 6 for radiating high-frequency radiation or microwave radiation with two devices 7a and 7b for producing the first excitation signal $A_1$ and the second excitation signal $A_2$ in the form of two, voltage-controlled oscillators and an evaluation unit 8.

The evaluation unit 8 is designed, on the basis of the fluorescence signal $L_F$, to produce the first excitation frequency $f_1$ and the second excitation frequency $f_2$ in such a way that, for the first excitation frequency $f_1$ and the second excitation frequency $f_2$, the fluorescence signal $L_F$ has a minimum in each case. The evaluation unit 8 from FIG. 2 comprises, by way of example, a first lock-in 9a and a second lock-in 9b, which serve for controlling the first excitation frequency $f_1$ and the second excitation frequency $f_2$ such that, at the two frequencies $f_1$ and $f_2$, the minimum in the fluorescence signal $L_F$ occurs in each case. Preferably, the first lock-in 9a and the second lock-in 9b can be controlled in parallel to each other.

In addition, the evaluation unit 8 can also be one or two control units (not shown here) for regulating the first frequency $f_1$ and/or the second frequency $f_2$. In addition to the evaluation unit shown here with the first lock-in 9a and the second lock-in 9b, numerous further embodiments are provided for the evaluation unit 8, in particular for the variation and/or control of the frequencies $f_1$, $f_2$ of the excitation signals $A_1$, $A_2$, which also fall under the present invention.

The evaluation unit further comprises two modulation units 10a and 10b for producing a first modulation signal $A_{mod,1}$ and a second modulation signal $A_{mod,2}$, having a first modulation frequency $f_{mod,1}$ and a second modulation frequency $f_{mod,2}$, by means of which modulation signals $A_{mod,1}$, $A_{mod,2}$ the first excitation signal $A_1$ and the second excitation signal $A_2$ are modulated. On the basis of the two modulation signals $A_{mod,1}$, $A_{mod,2}$, the first excitation frequency $f_1$ and the second excitation frequency $f_2$ can be distinguished from one another in continuous operation. Preferably, the two modulation signals $A_{mod,1}$, $A_{mod,2}$ are different, and in particular have different frequencies $f_{mod,1}$, $f_{mod,2}$.

The detection unit 3 allows the simultaneous and independent control of the first excitation signal $A_1$ and the second excitation signal $A_2$ or an independent determination of the two frequencies $f_1$ and $f_2$, which serve for ascertaining a value representative of the magnetic field. Preferably, the two voltage-controlled oscillators 7a and 7b are operated in two different, non-overlapping frequency ranges.

Advantageously, by selecting different frequency ranges for the two voltage-controlled oscillators 7a and 7b and/or by selecting different modulation frequencies $f_{mod,1}$, $f_{mod,2}$ for the two modulation signals $A_{mod,1}$, $A_{mod,2}$, a mutual influence of the two measurement channels for determining the first frequency $f_1$ and the second frequency $f_2$ can be excluded. Both frequencies $f_1$ and $f_2$ can be determined simultaneously and continuously, in particular in the regulated state of the system.

Figure 3:
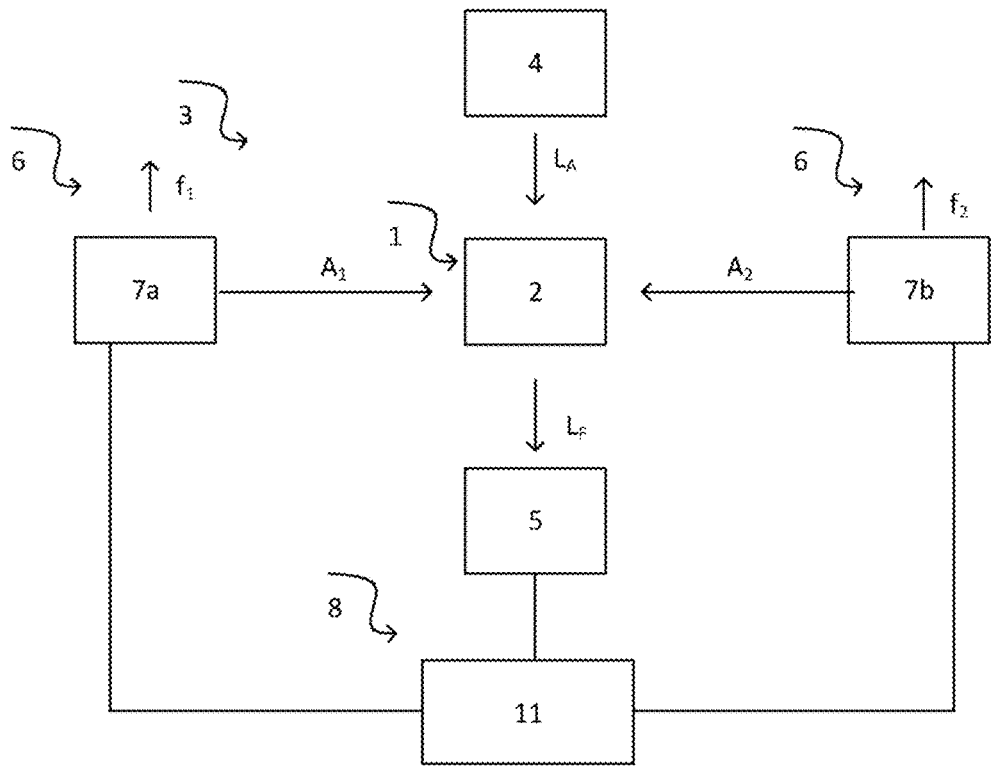
FIG. 3 shows a second embodiment of a detection unit according to the present disclosure.

A second preferred embodiment of a detection unit 3 according to the invention is the subject matter of FIG. 3. In the case of FIG. 3, the evaluation unit 8 comprises a computing unit 11 in which at least one algorithm is stored for ascertaining the first excitation frequency $f_1$ and/or the second excitation frequency $f_2$ on the basis of the fluorescence signal $L_F$. In this embodiment, the computing unit 11 thus in principle takes over the tasks of the first and second lock-ins 9a, 9b and the task of the two modulation units 10a and 10b from FIG. 2. In particular, the algorithm is configured to use a global minimum of an integral intensity of the fluorescence signal $L_F$ to determine the first frequency $f_1$ and the second frequency $f_2$. In this case, the evaluation unit 8 can also further be connected via two control units (likewise not shown separately here) to the, in particular, correlated variation of the two frequencies $f_1$, $f_2$.

Figure 4:
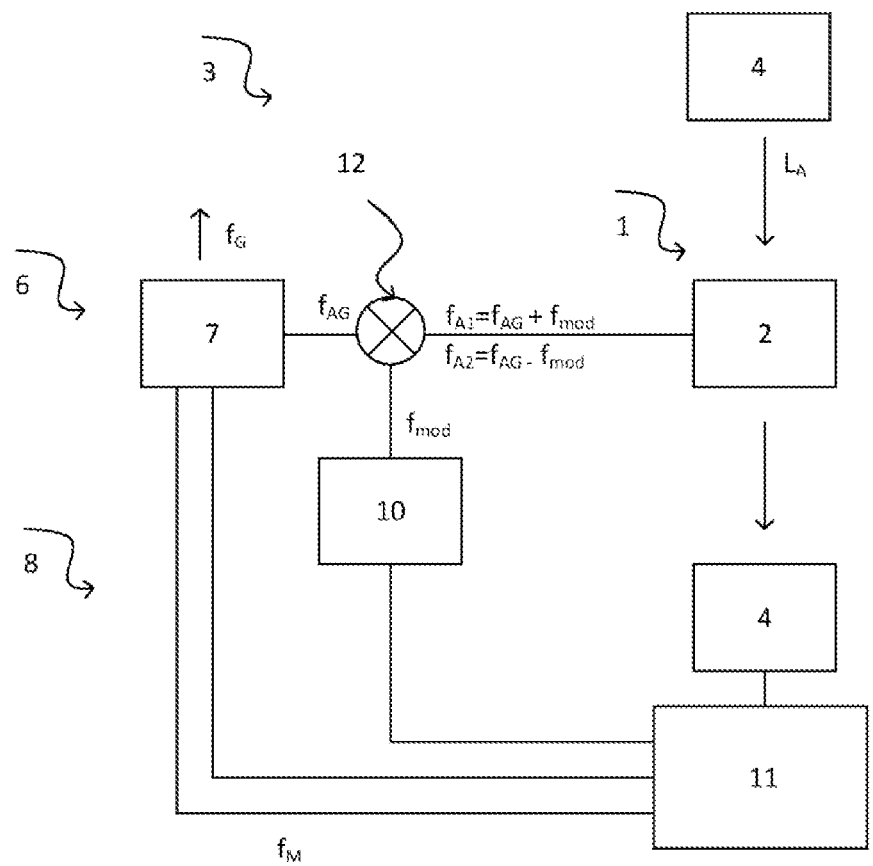
FIG. 4 shows a third embodiment of a detection unit according to the present disclosure.

A third preferred embodiment of a detection unit 3 according to the invention is shown in FIG. 4. The excitation unit 6 comprises a device 7 for producing at least one excitation signal A in the form of a voltage-controlled oscillator or the like and a mixing unit 12—in this case, in the form of a multiplier.

By means of the voltage-controlled oscillator 7, a base excitation signal AG having a base excitation frequency $f_{AG}$ is produced. By means of the modulation unit 10, a modulation excitation signal $A_{mod}$ is in turn produced with a modulation excitation frequency $f_{mod}$. The base excitation frequency $f_{AG}$ and the modulation frequency $f_{mod}$ are determined by means of a suitable algorithm stored in the computing unit 11 such that an integral intensity of the fluorescence signal $L_F$ has a global minimum.

The first excitation signal $A_1$ or the second excitation signal $A_2$ result in this case from a sum or difference of the base excitation frequency $f_G$ and the modulation frequency $f_{mod}$. In this case, the equation $\Delta f = 2f_{mod}$ results. From the base excitation frequency $f_{AG}$, a temperature in the region of the crystal body 2 can, further optionally, be obtained, in particular on the basis of the zero-field splitting of the ground state.

Moreover, for the embodiment from FIG. 4, an optional additional modulation having a low-frequency modulation frequency $f_M$ for reducing interference effects is implemented.

Figure 5:
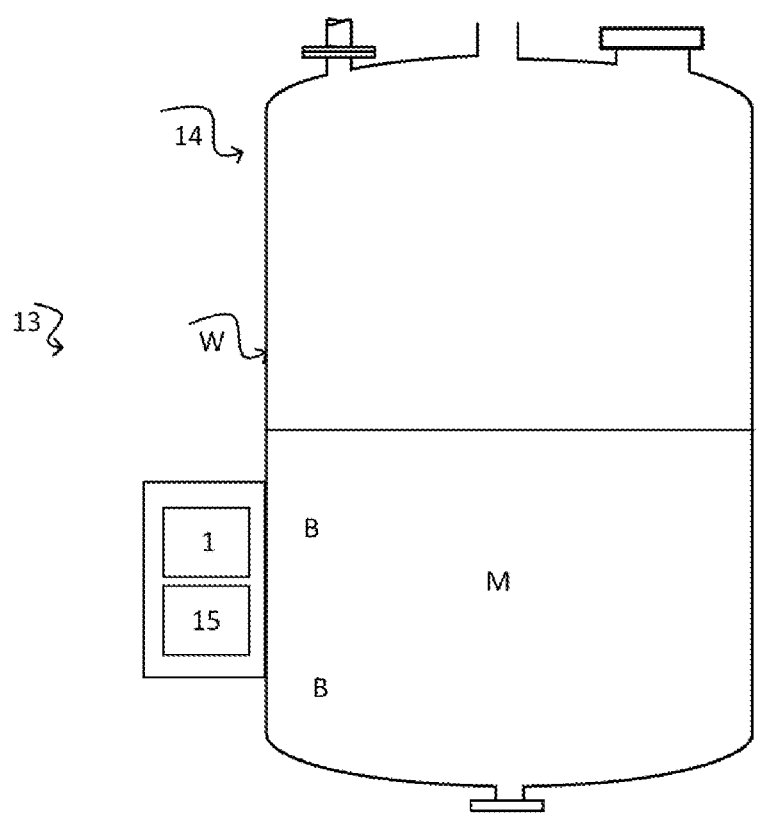
FIG. 5 shows an exemplary sensor device according to the present disclosure.

FIG. 5, finally, shows a sensor arrangement 13 according to the invention which serves for the determination and/or monitoring of a process variable and/or characteristic variable of a medium M in a container 14. The sensor arrangement 13 comprises a magnetic sensor 1 according to the invention, a magnetic field device 15 for producing a magnetic field (shown here on the basis of the magnetic flux density B), which penetrates the crystal body 2 of the magnetic sensor 1 and at least a part of the medium M, and a detection unit 3 according to the invention. A change in the process variable and/or characteristic variable of the medium leads here, for example, to a change in the magnetic flux density B which can be detected by means of the magnetic sensor 1, which comprises a detection unit 3 according to the invention. Numerous different embodiments are conceivable of the sensor device 13 according to the invention.

The invention claimed is:

1. A detection unit for a magnetic sensor for detecting a magnetic flux density via a crystal body having at least one defect, the detection unit comprising:
 a light source for optical excitation of the at least one defect in the crystal body with an excitation light;
 an excitation unit, including a mixing unit, for producing a high-frequency radiation in a region of the crystal body, wherein the excitation unit is designed to produce a first excitation signal having a first specifiable excitation frequency and a second excitation signal having a second specifiable excitation frequency, wherein the excitation unit is further designed to produce a base excitation signal having a base excitation frequency and a modulation excitation signal having a modulation excitation frequency and produce the first excitation signal from a sum of the base excitation frequency and the modulation frequency and produce the second excitation signal from a difference between the base excitation frequency and the modulation frequency;

a detector of a magnetic-field-dependent fluorescence signal from the crystal body; and an evaluation unit which is designed to:
   ascertain the first excitation frequency of the first excitation signal and the second excitation frequency of the second excitation signal on the basis of the fluorescence signal such that the fluorescence signal as a function of the frequency has a minimum at the first excitation frequency and/or at the second excitation frequency, and
   calculate the magnetic flux density on the basis of the first excitation frequency and the second excitation frequency.

2. The detection unit according to claim 1, wherein the evaluation unit includes a computing unit in which at least one algorithm for determining the first excitation frequency and/or the second excitation frequency on the basis of the fluorescence signal is stored.

3. The detection unit according to claim 1, wherein the evaluation unit is configured to ascertain the modulation excitation frequency so that it is proportional to the difference between the first excitation frequency and the second excitation frequency.

4. A method for detecting a magnetic flux density using a magnetic sensor with a crystal body having at least one defect, the method comprising:
   optically exciting the at least one defect of the crystal body with an excitation light;
   producing high-frequency radiation in a region of the crystal body by:
      producing a base excitation signal having a base excitation frequency and a modulation excitation signal having a modulation excitation frequency;
      producing a first excitation signal from a sum of the base excitation frequency and the modulation frequency; and
      producing a second excitation signal from a difference between the base excitation frequency and the modulation frequency;
   detecting a magnetic-field-dependent fluorescence signal from the crystal body;
   determining a first excitation frequency of the first excitation signal and a second excitation frequency of the second excitation signal on the basis of the fluorescence signal such that the fluorescence signal as a function of the frequency has a minimum at the first excitation frequency and at the second excitation frequency; and
   calculating the magnetic flux density on the basis of the first excitation frequency and the second excitation frequency.

5. A detection unit for a magnetic sensor for detecting a magnetic flux density via a crystal body having at least one defect, the detection unit comprising:
   a light source for optical excitation of the at least one defect in the crystal body with an excitation light;
   an excitation unit for producing a high-frequency radiation in a region of the crystal body, wherein the excitation unit is designed to produce a first excitation signal having a first specifiable excitation frequency and a second excitation signal having a second specifiable excitation frequency;
   a detector of a magnetic-field-dependent fluorescence signal from the crystal body; and
   an evaluation unit which is designed to:
      ascertain an extreme value of an integral intensity of the fluorescence signal and to ascertain the first excitation frequency and the second excitation frequency on the basis of the extreme value, and
      calculate the magnetic flux density on the basis of the first excitation frequency and the second excitation frequency.

* * * * *